2,771,338

MANUFACTURE OF URANIUM PEROXIDE

Louis Spiegler, Woodbury, N. J., assignor to the United States of America as represented by the United States Atomic Energy Commission No Drawing. Application March 15, 1945,
Serial No. 582,996

5 Claims. (Cl. 23—14.5)

This invention relates to the manufacture of uranium peroxide. It is particularly concerned with the production of uranium peroxide of low fluorine content from uranium compositions containing magnesium and fluorine.

In the manufacture of metallic uranium by heating uranium tetrafluoride with magnesium, slags and dross are formed containing substantial quantities of uranium together with magnesium and fluorine. The process is usually carried out in reaction chambers lined with lime and consequently calcium also is present in the by-products. In the recovery of uranium from such materials by conversion of the uranium to uranyl sulfate and subsequent precipitation of uranium peroxide from aqueous uranyl sulfate solution, as described and claimed in my U. S. patent application Serial No. 559,665 entitled, "Separation of Uranium From Mixtures," filed October 20, 1944, small quantities of magnesium and fluorine are precipitated along with the uranium peroxide. As a consequence the uranium peroxide may be contaminated with fluorine in an amount from a few tenths of one percent to two or three percent, depending upon the original fluorine and magnesium contents of the uranyl sulfate solution. While the fluorine content may be reduced to an insignificant value by roasting the uranium-containing materials with sulfuric acid to expel the fluorine as hydrogen fluoride as described in my U. S. Patent No. 2,733,126, entitled "Uranium Liberation," issued on January 31, 1956, it is sometimes desirable to recover the product without employing a sulfuric acid roast. For example, in working up uranium-containing mixtures containing relatively small proportions of fluorine, the amounts of by-product hydrogen fluoride which can be recovered are not sufficient to offset the cost of recovery. For such materials a more economical process is desirable even though it does not provide for recovery of fluorine.

An object of the invention is the production of uranium peroxide of low fluorine content from materials containing magnesium and fluorine as well as uranium. Further objects will be apparent from the following description.

In accordance with the present invention uranium peroxide is precipitated from an aqueous uranyl salt solution containing magnesium and fluorine in the presence of a substantial quantity of dissolved ammonium sulfate. I have found that the ammonium sulfate exerts a retarding effect upon precipitation of fluorides from such solutions so that uranium peroxide can be precipitated while fluorine remains in solution. This action of the ammonium sulfate permits the recovery of uranium peroxide containing substantially less fluorine than products obtainable from the same composition in the absence of ammonium sulfate. The ammonium sulfate not only holds fluorine in solution but also improves the crystalline form of the uranium peroxide so that it can be operated from mother liquor more easily than the peroxide obtained from solutions which do not contain the ammonium salt.

While I have applied the process satisfactorily to solutions containing as little as ½% uranyl sulfate, I prefer, because of practical considerations, to provide an aqueous uranyl sulfate solution containing between 3% and 16% by weight of uranyl sulfate and between 1 and 2½ mols of ammonium sulfate for each mol of uranyl sulfate, and having a hydrogen ion concentration corresponding to a pH between 2 and 4, and then to add sufficient peroxide in the form of hydrogen peroxide or alkali-metal peroxide to substantially completely precipitate the uranium content of the solution as the uranium peroxide. During or after the addition of the peroxide to the solution, the hydrogen ion concentration is re-adjusted as necessary by the addition of an acid or alkaline reagent to restore the desired pH value. To avoid decomposition of uranium peroxide, I prefer to effect the precipitation at temperatures below 65° C.; and to secure large, well-formed crystals, I prefer temperatures of at least 30° C. The crystalline uranium peroxide should be separated from the solution promptly. The sooner it is separated, the lower will be the fluorine content of the product. If the solution is allowed to stand in contact with the precipitate for more than one or two hours, a product of substantially reduced fluorine content may not be secured.

In the following examples proportions are in terms of weight unless otherwise indicated.

Example 1

Uranium metal prepared by reduction of uranium tetrafluoride by magnesium and coated with a crust of slag was boiled in a weakly acid solution to remove the slag. The slag thus removed was separated from the solution, dried, roasted in air and ground. This material, containing 56% of uranium, ½% of iron and 8% each of calcium, magnesium, and fluorine was mixed with aqueous 10% $H_2SO_4$ solution. Hydrogen peroxide solution was added to convert tetravalent uranium to hexavalent form; calcium carbonate was then added, bringing the pH of the mixture to 3.7; the mixture was maintained between 85° and 90° C. for 1 hour and was then filtered. The filter cake was washed with water and the wash water and filtrate were combined providing a solution containing 6.0% uranium and ¼% fluorine.

Two 345 cc. portions, A and B, of the solution were used in the following comparative tests. Ammonium sulfate was added only to solution B. Aqueous hydrogen peroxide solution was then added to each of the two solutions. The pH's of the two solutions were adjusted to 2.9 by adding aqueous 30% NaOH solution. The solutions were then filtered to remove precipitate and the filter-cakes were washed with water and dried. Solution B filtered much more rapidly than solution A and the wet filter-cake contained substantially less adhering wash liquor. The data for the two solutions are tabulated below.

|  | Solution A | Solution B |
|---|---|---|
| $(NH_4)_2SO_4$ added_____grams__ | None | 23 |
| $H_2O_2$ solution added_____cc__ | 20 | 20 |
| NaOH solution added_____cc__ | 18 | 16½ |
| Wt. of wet filter cake_____grams__ | 77 | 42 |
| Dry $UO_4.2H_2O$ recovered_____do__ | 29 | 29 |
| Wt. Percent F in Dry $UO_4.2H_2O$_____percent__ | 2.2 | 1.3 |

Example 2

A material similar to that treated in the preceding example, after roasting, grinding, dissolving in sulfuric acid and neutralizing with calcium carbonate to a pH of 3.65, provided an aqueous uranyl sulfate solution containing 69 grams of uranium and 1⅓ grams of fluorine per liter. Two 420 cc. portions of this solution were used for comparative tests in which, for solution A, ammonium sulfate was added before precipitation of the peroxide, and for solution B, an equal amount of sodium sulfate was added. The peroxide was added as a 28% solution of $H_2O_2$ while the uranyl sulfate solutions were maintained at 40–45° C. The pH's of the solutions were brought to 3.0 by adding 30% NaOH solution and then the solutions were filtered. The data for the two solutions are tabulated below:

|  | Solution A | Solution B |
|---|---|---|
| $(NH_4)_2SO_4$ Added_____grams__ | 23½ | None |
| $Na_2SO_4$ Added_____do____ | None | 23½ |
| $H_2O_2$ Solution Added_____cc__ | 19 | 19 |
| NaOH Solution Added_____cc__ | 20 | 20 |
| Wt. of Wet Filter Cake_____grams__ | 62 | 79 |
| Wt. of Dry Filter Cake_____do____ | 41 | 41 |
| F in Dry Filter Cake_____percent__ | 0.23 | 0.34 |
| U in Dry Filter Cake_____do____ | 66.9 | 68.2 |

*Example 3*

To 1125 parts of a uranyl sulfate solution, which was obtained by calcining uranium dross containing magnesium and fluorine with quick lime, digesting the calcined product with aqueous sulfuric acid at 90–95° C., neutralizing with calcium carbonate to a pH of 3.5 and filtering, and which contained 100 grams of uranium and 0.9 gram of fluorine per liter, 79 parts of ammonium sulfate was added while the solution was at a temperature of 90–95° C. The solution was acidified to a pH of 3.0 by adding dilute sulfuric acid and was allowed to cool to 40° C. It was filtered and then 63 parts of 27.5% $H_2O_2$ solution was added gradually beneath the surface in about 1 hour. During the addition, the solution pH fell to 1.45. 53 parts of aqueous ammonium hydroxide solution (28% $NH_3$) was added to restore the pH value to 3.0. The uranium peroxide precipitated as coarse yellow crystals which settled rapidly. The peroxide was separated from mother liquor by centrifuging. The solid material was washed with distilled water at 60° C. until no sulfate was detected in the wash water by testing with barium chloride. 142 parts of uranium peroxide was thus obtained containing less than 0.2% fluorine.

It will be understood that I intend to include variations and modifications of the invention and that the preceding examples are illustrations only and in no wise to be construed as limitations upon the invention, the scope of which is defined in the appended claims, wherein I claim:

1. In the recovery of uranium peroxide by precipitation from a uranyl sulfate solution containing magnesium and fluorine, the improvement which comprises effecting the uranium peroxide precipitation in the presence of dissolved ammonium sulfate and promptly separating the uranium peroxide from mother liquor.

2. In the recovery of uranium peroxide by precipitation from uranyl sulfate solution containing magnesium and fluorine, the method of producing a uranium peroxide of low fluorine content, which comprises effecting the uranium peroxide precipitation from a solution containing between one mol and 2½ mols of ammonium sulfate for each mol of uranyl sulfate, at a pH between 2 and 4 and a temperature below 65° C., and promptly separating the uranium peroxide from mother liquor.

3. The method of making uranium peroxide from uranyl sulfate containing magnesium and fluorine, which comprises providing a uranyl sulfate solution containing between ½% and 16% of uranyl sulfate and between one mol and 2½ mols of ammonium sulfate for each mol of uranyl sulfate and having a pH between 2 and 4, adding sufficient peroxide to convert the uranium to uranium peroxide while maintaining the solution at a temperature below 65° C., and promptly separating the uranium peroxide from mother liquor.

4. The method of making uranium peroxide from uranyl sulfate containing magnesium and fluorine, which comprises providing a uranyl sulfate solution containing between 3% and 16% of uranyl sulfate and between one mol and 2½ mols of ammonium sulfate for each mol of uranyl sulfate, adding sufficient hydrogen peroxide to convert the uranium to uranium peroxide while maintaining the solution at a pH between 2 and 4 and at a temperature between 30° C. and 65° C., and promptly separating the uranium peroxide from mother liquor.

5. The method of making uranium peroxide from uranyl sulfate containing magnesium and fluorine, which comprises providing a uranyl sulfate solution containing between 3% and 16% of uranyl sulfate and between one mol and 2½ mols of ammonium sulfate for each mol of uranyl sulfate and having a pH between 2 and 4 and a temperature between 30° and 65° C., adding sufficient hydrogen peroxide to convert the uranium to uranium peroxide and sufficient alkaline reagent to provide a final pH between 2 and 4, and promptly separating the uranium peroxide from mother liquor.

References Cited in the file of this patent

Rosenhum et al.: "Uranium Tetroxide Dihydrate," Chemical Abstracts, vol. 23, page 4634 (1929). (Copy in Sci. Lib.)

Lange: Handbook of Chemistry, 5th ed., p. 744–745 (1944), pub. by Handbook Publishers, Inc., Sandusky, Ohio. (Copy in Scientific Library.)